United States Patent
Hori (10) Patent No.: US 7,715,383 B2
(45) Date of Patent: May 11, 2010

(54) PACKET TRANSMISSION CONTROL METHOD, PACKET TRANSMISSION CONTROL APPARATUS AND PACKET TRANSMISSION CONTROL PROGRAM PRODUCT

(75) Inventor: Masato Hori, Kanagawa (JP)

(73) Assignee: NEC Infrontia Corporation, Kawasaki-shi (JP)

(*) Notice: Subject to any disclaimer, the term of this patent is extended or adjusted under 35 U.S.C. 154(b) by 767 days.

(21) Appl. No.: 11/189,696

(22) Filed: Jul. 27, 2005

(65) Prior Publication Data

US 2006/0023714 A1 Feb. 2, 2006

(30) Foreign Application Priority Data

Jul. 28, 2004 (JP) ............................. 2004-220186

(51) Int. Cl.
*H04L 12/28* (2006.01)
*G01R 31/08* (2006.01)

(52) U.S. Cl. .................. 370/389; 370/351; 370/395.21; 370/252; 370/230.1; 348/558; 714/25

(58) Field of Classification Search ................ 370/389, 370/351, 395.32, 395.4, 395.62, 395.2, 538, 370/471, 465, 466, 473, 474, 539, 230.1, 370/235.1, 252, 395.1, 412, 229; 348/558, 348/554; 380/201, 203; 713/176; 705/57; 340/825.31; 382/8; 709/224; 714/25, 26, 714/47

See application file for complete search history.

(56) References Cited

U.S. PATENT DOCUMENTS 4,882,764 A * 11/1989 Reynolds et al. ............ 382/112
6,009,108 A 12/1999 Takehara et al.
6,310,956 B1 * 10/2001 Morito et al. ............... 380/201
6,922,392 B2 * 7/2005 Matsufuru ............... 370/230.1
2001/0006190 A1 * 7/2001 Piva et al. .................... 235/454
2003/0231646 A1 * 12/2003 Chandra et al. ............. 370/412
2005/0134736 A1 * 6/2005 Meiners ...................... 348/558

FOREIGN PATENT DOCUMENTS

| JP | 01-101745 | 4/1989 |
| JP | 09-139720 | 5/1997 |
| JP | 09-200265 | 5/1997 |
| JP | 09-200265 | 7/1997 |
| JP | 10-233805 | 9/1998 |
| JP | 11-150562 | 6/1999 |
| JP | 2002-532959 A | 6/2000 |
| JP | 2000-349824 | 12/2000 |
| WO | WO 00/59166 | 10/2000 |

* cited by examiner

*Primary Examiner*—Aung S Moe
*Assistant Examiner*—Jamal Javaid
(74) *Attorney, Agent, or Firm*—Foley & Lardner LLP (57) ABSTRACT

According to an embodiment, previous data group input time is subtracted from current data group input time in order to obtain a difference time each time a data group is input. The difference time is subtracted from a packet transmission interval in order to obtain an interval difference. The interval difference is added to a total difference time. If the total difference time is not greater than the first predetermined value, then the input data group is transmitted as a packet. Otherwise, the input data group is discarded and the total difference time is initialized to a value obtained by subtracting the packet transmission interval from the first predetermined value, if the total difference time is greater than the first predetermined value.

12 Claims, 7 Drawing Sheets

PACKET TRANSMISSION CONTROL METHOD, PACKET TRANSMISSION CONTROL APPARATUS AND PACKET TRANSMISSION CONTROL PROGRAM PRODUCT

BACKGROUND OF THE INVENTION

The present invention relates to a packet transmission control method, a packet transmission control apparatus and a packet transmission control program product for transmitting packets. In particular, the present invention relates to a packet transmission control method, a packet transmission control apparatus and a packet transmission control program product for transmitting packets at regular time intervals.

In recent years, voice communication using the Internet has spread. This voice communication is conducted by converting CODEC signals to IP packets, and is known as VoIP (Voice over Internet Protocol).

If in the conventional technique the quantity of voice data supplied from a voice input device in a VoIP terminal exceeds the quantity that can be processed by voice packets transmitted at predetermined periods, transmission packets cannot be transmitted periodically and consequently noise is caused in some cases by overflow from a buffer in a VoIP terminal of the receiving side.

According to invention disclosed in JP-A-01-101745, high quality real time voice communication is implemented by discarding packets on the receiving side until the transmission flow is stabilized.

According to invention disclosed in JP-A-11-150562, sample values are discarded before ADPCM encoding, thereby decoding is conducted properly even when packets are discarded for the purpose of flow control.

Invention disclosed in JP-A-2002-532959 relates to processing of WLL (Wireless Local Loop) and wireless information.

SUMMARY OF THE INVENTION

An object of the present invention is to provide a packet transmission control method, a packet transmission control apparatus and a packet transmission control program product that make it possible to transmit packets normally even if the quantity of data supplied from input devices exceeds the quantity that can be processed by packets transmitted at predetermined periods.

According to the present invention, there is provided a packet transmission control method comprising the steps of: subtracting previous data group input time from current data group input time in order to obtain a difference time each time a data group is input; subtracting the difference time from a packet transmission interval in order to obtain an interval difference; adding the interval difference to a total difference time; determining whether or not the total difference time is greater than a first predetermined value; transmitting the input data group as a packet, if the total difference time is not greater than the first predetermined value; and discarding the input data group and initializing the total difference time to a value obtained by subtracting the packet transmission interval from the first predetermined value, if the total difference time is greater than the first predetermined value.

In the packet transmission control method, if the difference time is greater than a second predetermined value, the step of adding the interval difference to the total difference time may be substituted by a step of initializing the total difference time to a third predetermined value.

In the packet transmission control method, the third predetermined value may be in a range between a value obtained by subtracting the packet transmission interval from the first predetermined value and the first predetermined value.

According to the present invention, an input data group is discarded in a predetermined case. Even if the quantity of the input data group is a quantity that cannot be transmitted as packets, it becomes possible to transmit the input data group as normal packets. Therefore, it is possible to prevent overflow from a buffer on the receiving side and prevent the operation on the receiving side from becoming abnormal.

DESCRIPTION OF THE EMBODIMENTS

Hereafter, embodiments of the present invention will be described in detail with reference to the drawings.

In the following description, data is supposed to be voice data. However, the present invention is not restricted to the voice data, but data may be various data such as video data.

First Embodiment

Voice data is received from a voice input device by a VoIP terminal. Even if the actual quantity of the voice data exceeds the quantity that can be transmitted by using voice packets transmitted at predetermined intervals, the actual data quantity is adjusted and it is made possible to transmit voice packets periodically, according to the present invention.

Figure 1:
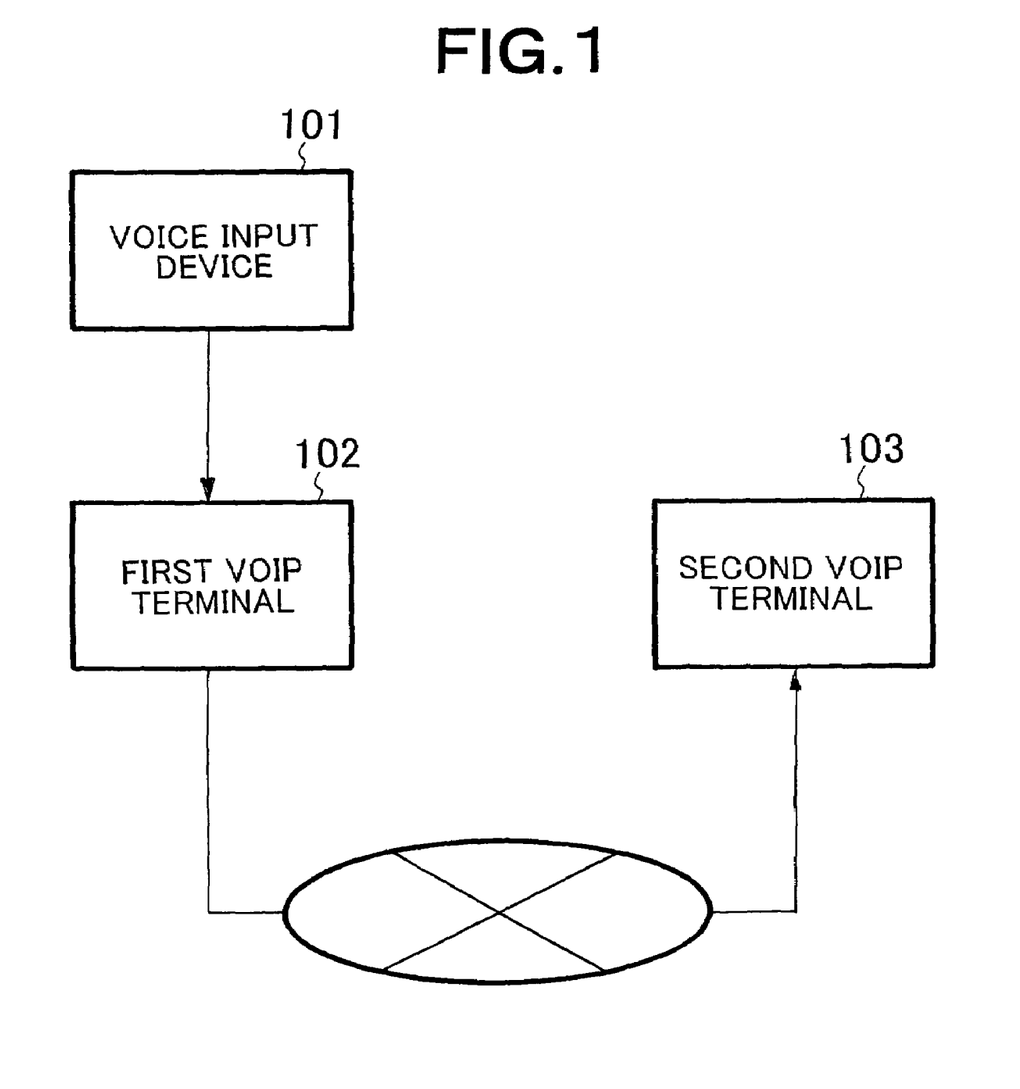
FIG. 1 is a block diagram showing a configuration of a VoIP talking system according to an embodiment of the present invention.

With reference to FIG. 1, a voice input device 101 is connected to a first VoIP terminal 102 via a USB (Universal Serial Bus) or an audio input terminal. Voice in VoIP talking is transmitted from the voice input device 101 to the first VoIP terminal 102. The first VoIP terminal 102 includes a VoIP application unit 151 (see FIG. 2), and the first VoIP terminal 102 is capable of conducting VoIP talking with the second VoIP terminal 103. When the quantity of the voice data received from the voice input device 101 goes beyond or below a real time processable range, the first VoIP terminal 102 can exercise flow control and transmit voice packets periodically. The second VoIP terminal 103 includes the VoIP application unit 151 similarly to the first VoIP terminal 102. The first VoIP terminal 102 and the second VoIP terminal 103 can conduct VoIP talking with each other.

Thus, in the present invention, a VoIP terminal can transmit voice packets periodically by exercising flow control of voice data at the time of voice capture processing.

With reference to FIG. 1, the present embodiment includes the first VoIP terminal 102 and the second VoIP terminal 103 which can conduct VoIP talking with each other, and the voice input device 101 connected to the first VoIP terminal 102.

Figure 2:
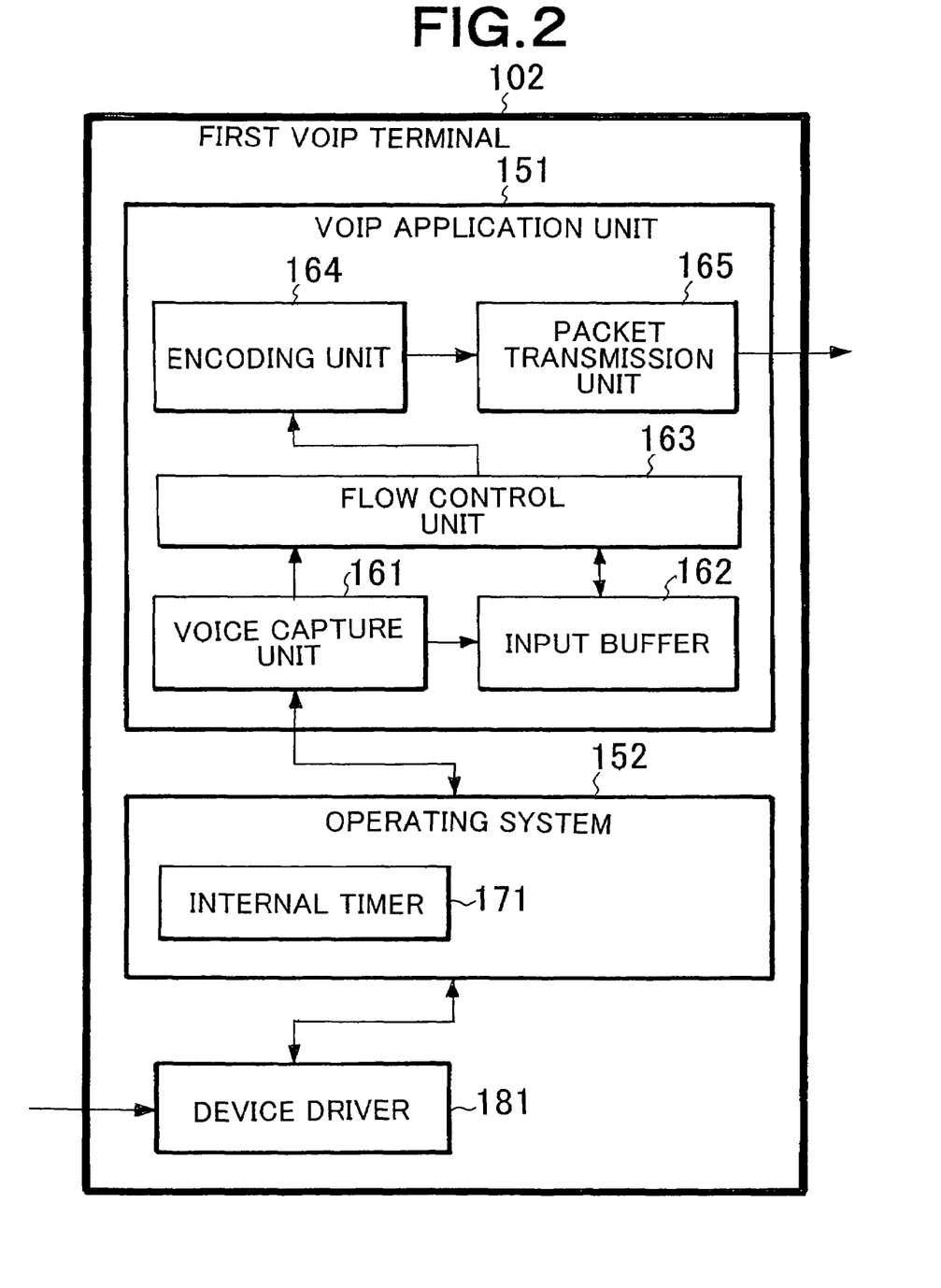
FIG. 2 is a block diagram showing a configuration of a first VoIP terminal according to the embodiment of the present invention.

With reference to FIG. 2, the first VoIP terminal 102 includes a VoIP application unit 151, an operating system 152, and a device driver 181. By the way, the VoIP application unit 151, the operating system 152, and the device driver 181 may be implemented by using hardware. Typically, however, they are implemented by using a computer program product recorded on a computer-readable medium which is read and executed by a computer.

The device driver 181 controls the voice input device 101. In response to an order from the VoIP application unit 151, the operating system 152 controls the device driver 181, acquires voice data, and transfers the voice data to the VoIP application unit 151. The operating system 152 includes an internal timer 171 for counting the real time, and returns the timer value in response to an order from the VoIP application unit 151.

The VoIP application unit 151 includes a voice capture unit 161, an input buffer 162, a flow control unit 163, an encoding unit 164, and a packet transmission unit 165. The voice capture unit 161 periodically issues a request for voice data per transmission interval to the operating system 152, and stores data transferred from the operating system 152 in the input buffer 162. The voice capture unit 161 gives a notice that the data has stored in the input buffer 162 to the flow control unit 163. Upon being triggered by the notice, the flow control unit 163 transfers the data stored in the input buffer 162 to the encoding unit 164. At the time of this transfer, adjustment of the packet quantity is conducted. The encoding unit 164 encodes the voice data transferred from the flow control unit 163. The packet transmission unit 165 provides the encoded voice data with an RTP header, and then transmits voice packets to the second VoIP terminal 103 at timing of packet transmission intervals.

When the first VoIP terminal 102 and the second VoIP terminal 103 are conducting VoIP talking using CODECs of, for example, 30 ms periods, the voice capture unit 161 issues a request for voice data per 30 ms to the operating system 152. The operating system 152 controls the device driver 181, acquires voice data, and forwards the voice data to the voice capture unit 161. The voice capture unit 161 stores the received voice data per 30 ms in the input buffer 162, and sends a writing notice to the flow control unit 163. Whenever the flow control unit 163 receives a writing notice, it checks the receiving interval of the voice data, adjusts the packet quantity, and then forwards the voice data stored in the input buffer 162 to the encoding unit 164. The encoding unit 164 encodes the received voice data. The packet transmission unit 165 provides the encoded voice data with an RTP header, and then transmits voice packets to the second VoIP terminal 103 at timing of packet transmission intervals.

Figure 3:
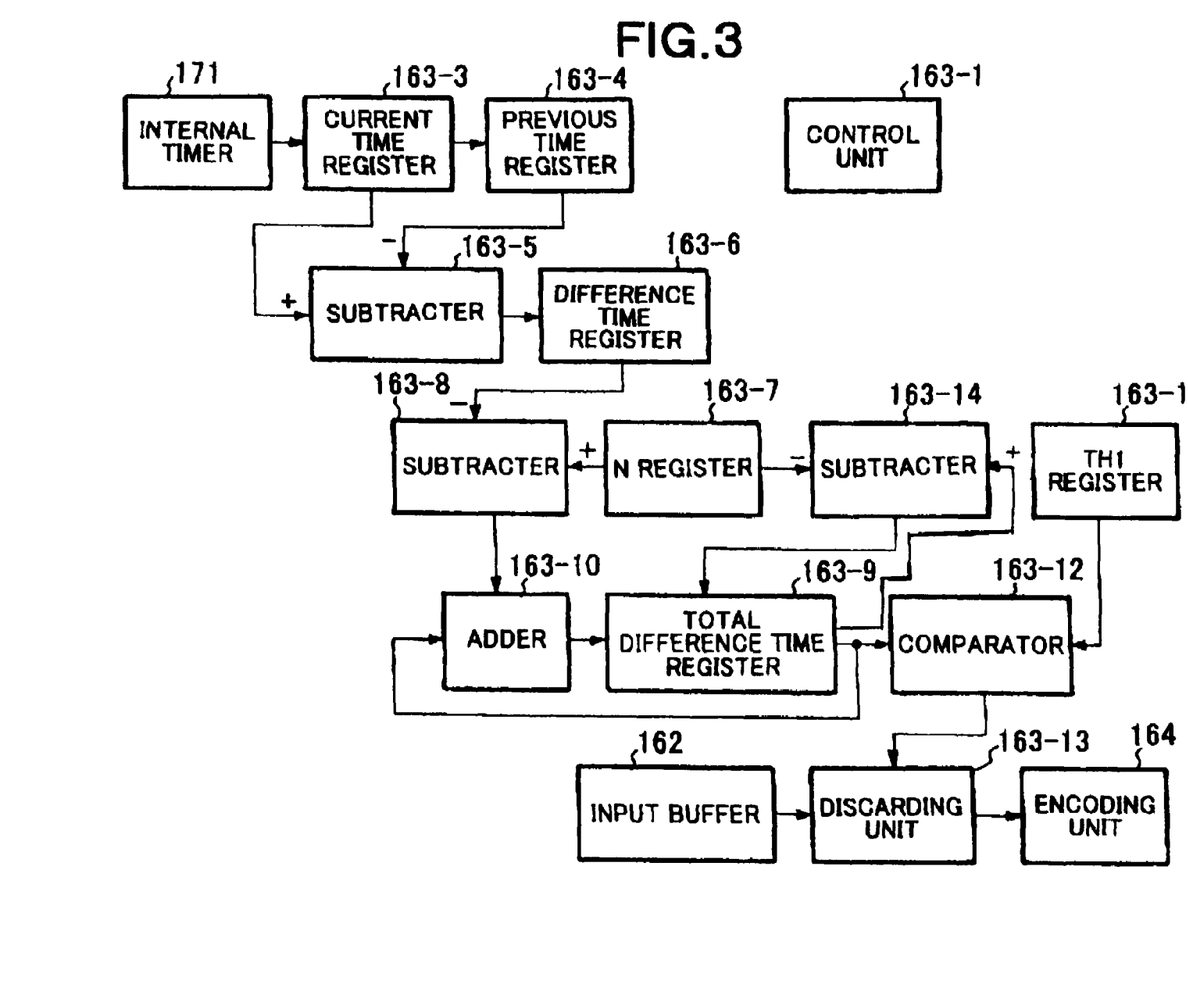
FIG. 3 is a block diagram showing a configuration of a flow control unit and its peripheral units according to a first embodiment of the present invention.

The flow control unit 163 will now be described. FIG. 3 is a block diagram showing a configuration of the flow control unit 163 and related portions.

With reference to FIG. 3, the flow control unit 163 includes a control unit 163-1, a current time register 163-3, a previous time register 163-4, a subtracter 163-5, a difference time register 163-6, an N register 163-7, a subtracter 163-8, a total difference time register 163-9, an adder 163-10, a TH1 register 163-11, a comparator 163-12, a discarding unit 163-13 and a subtracter 163-14.

The control unit 163-1 controls operation timing of components in the flow control unit 163. The current time register 163-3 samples a timer value output by the internal timer 171 each time the writing notice is given. The previous time register 163-4 samples an output value of the current time register 163-3 each time the writing notice is given. The subtracter 163-5 subtracts an output value of the previous time register 163-4 from an output value of the current time register 163-3. The difference time register 163-6 samples an output value of the subtracter 163-5 each time the writing notice is given. The N register 163-7 retains a packet transmission interval N. The subtracter 163-8 subtracts an output value of the difference time register 163-6 from an output value of the N register 163-7. The total difference time register 163-9 samples an output of the adder 163-10 each time the writing notice is given. An output value of the total difference time register 163-9 is reset to an output value of the subtracter 163-14 when discarding has been conducted. The adder 163-10 adds an output value of the subtracter 163-8 to the output value of the total difference time register 163-9. The TH1 register 163-11 retains a first threshold TH1. The first threshold TH1 is 0. The comparator 163-12 determines whether the output value of the total difference time register 163-9 is not greater than an output value of the TH1 register 163-11. When the output value of the total difference time register 163-9 exceeds the output value of the TH1 register 163-11, the discarding unit 163-13 discards data read out from the input buffer 162. The subtracter 163-14 subtracts the output value of the N register 163-7 from the output value of the total difference time register 163-9.

Operation of the flow control unit 163 will now be described with reference to FIGS. 3 and 4.

Figure 4:
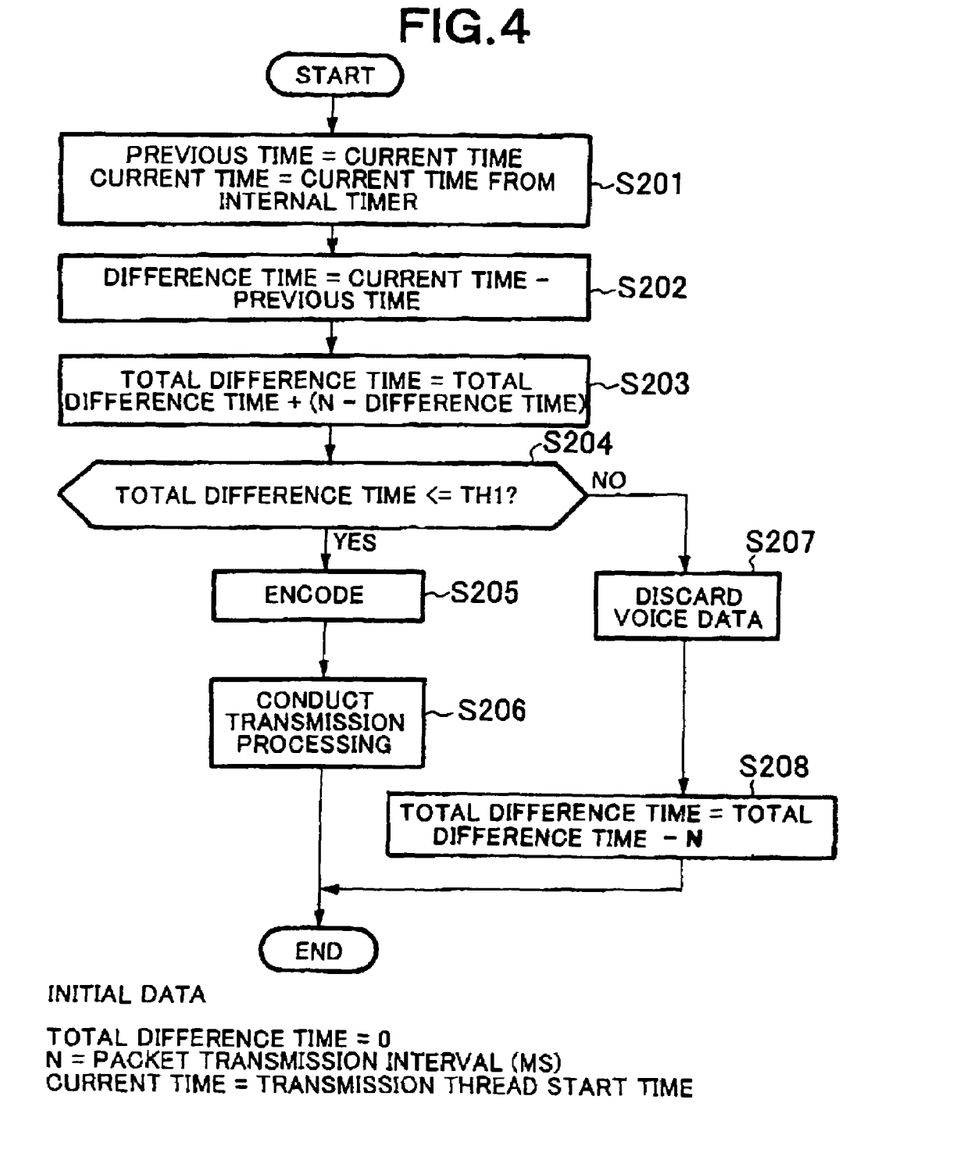
FIG. 4 is a flow chart showing operation of the flow control unit according to the first embodiment of the present invention.

Operation shown in FIG. 4 is conducted each time the writing notice is given.

First, the output value of the current time register 163-3 is transferred to the previous time register 163-4. Subsequently, the current time which is the output value of the internal timer 171 is transferred to the current time register 163-3 (step S201).

Subsequently, the subtracter 163-5 subtracts the previous time in the previous time register 163-4 from the current time in the current time register 163-3 to obtain a difference time, which is transferred to the difference time register 163-6 (step S202).

The subtracter 163-8 subtracts the output value of the difference time register 163-6 from the output value of the N register 163-7 to obtain an interval difference. The adder 163-10 adds the interval difference to the output value of the total difference time register 163-9, which is transferred to the total difference time register 163-9 as a new total difference time (step S203).

Subsequently, the comparator 163-12 makes a decision whether the output value of the total difference time register 163-9 is not greater than the output value of the TH1 register 163-11 (step S204).

If a result of the decision at the step S204 is true, the encoding unit 164 encodes voice data read out from the input buffer 162 (step S205) and the packet transmission unit 165 transmits the encoded voice data (step S206).

If the result of the decision at the step S204 is false, the discarding unit 163-13 discards voice data read out from the input register 162 (step S207). Subsequently, the subtractor 163-14 subtracts the output value of N register 163-7 from the output value of the total difference time register 163-9 to output a difference, which is transferred to the total difference time register 163-9 (step S208).

Figure 5:
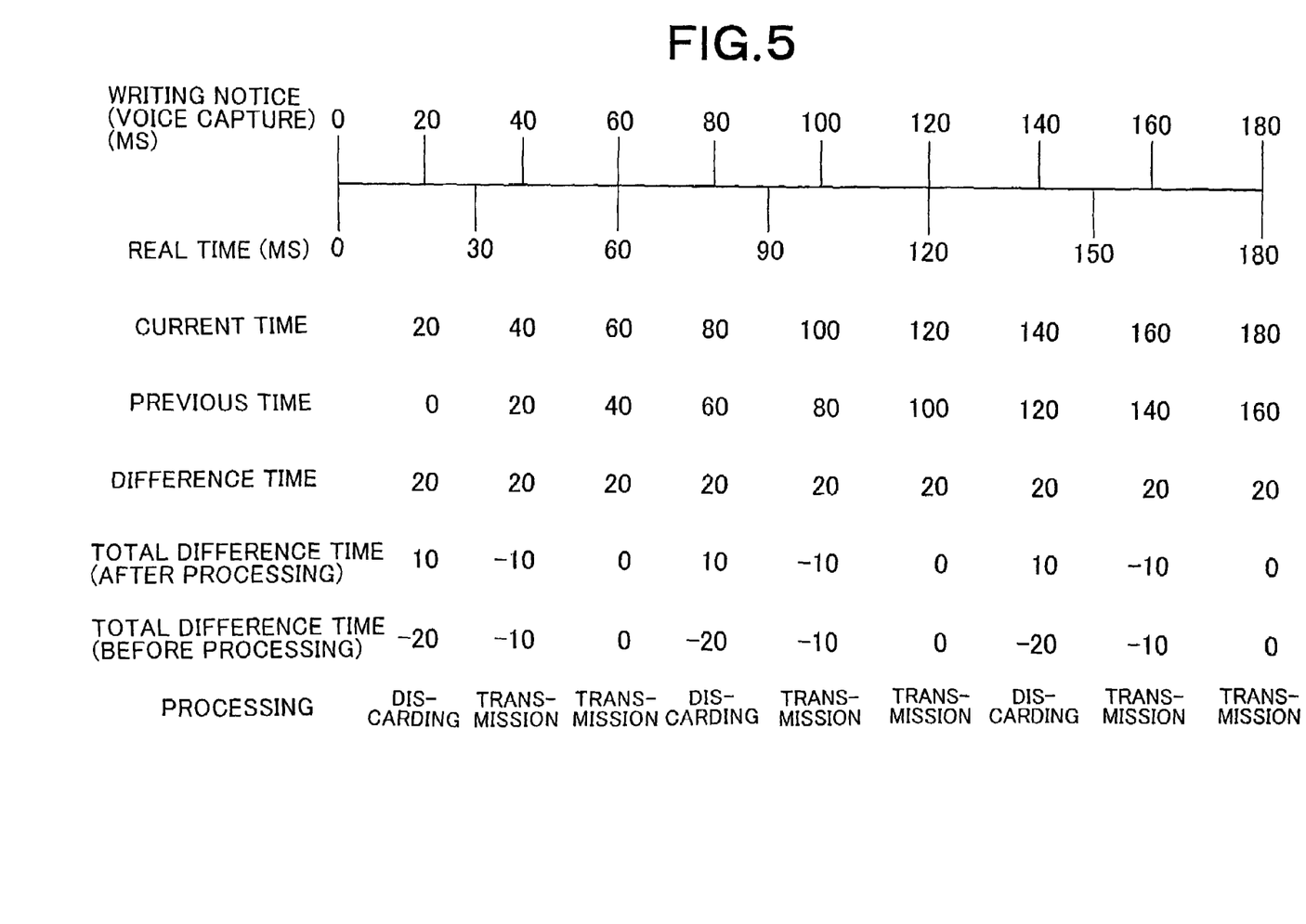
FIG. 5 is a timing chart showing an operation example according to an embodiment of the present invention.

FIG. 5 shows an operation example. In the example shown in FIG. 5, the value of the packet transmission interval N is 30 ms, the value of the first threshold TH1 is zero, and the interval of the writing notice is 20 ms. By conducting data discarding once every three times of writing notice, it becomes possible to transmit packets normally at intervals of 30 ms.

Second Embodiment

A second embodiment will now be described. In the second embodiment, it is determined whether the difference time obtained by the subtracter 163-5 is too great. If the difference time is too great, it is judged that muting (voice data input cease) or VoIP talking disconnection has been conducted by the voice input device.

Figure 6:
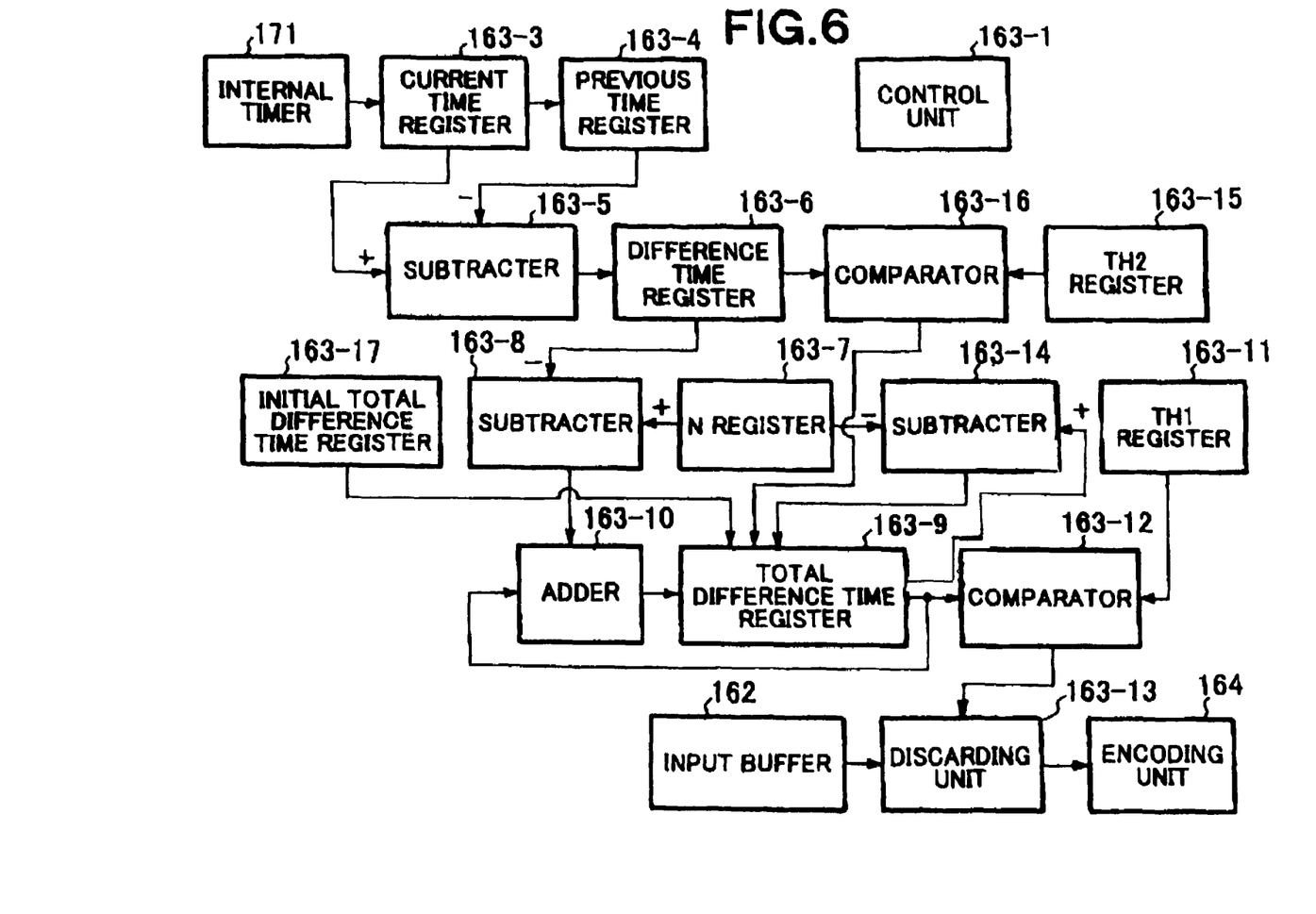
FIG. 6 is a block diagram showing a configuration of a flow control unit and its peripheral units according to a second embodiment of the present invention.

FIG. 6 is a block diagram showing a configuration of the flow control unit 163 and related units according to the second embodiment of the present invention.

As evident from comparison of FIG. 6 with FIG. 3, the flow control unit 163 according to the second embodiment differs from the flow control unit 163 according to the first embodiment in that a TH2 register 163-15, a comparator 163-16 and an initial total difference time register 163-17 are added.

The TH2 register 163-15 retains a threshold TH2 for making a decision whether muting or the like is being conducted. The value of the threshold TH2 is set equal to, for example, 300 ms. The comparator 163-16 compares the output value of the difference time register 163-6 with an output value of the TH2 register 163-15. The initial total difference time register 163-17 retains an initial value to be used when initializing the total difference time.

Figure 7:
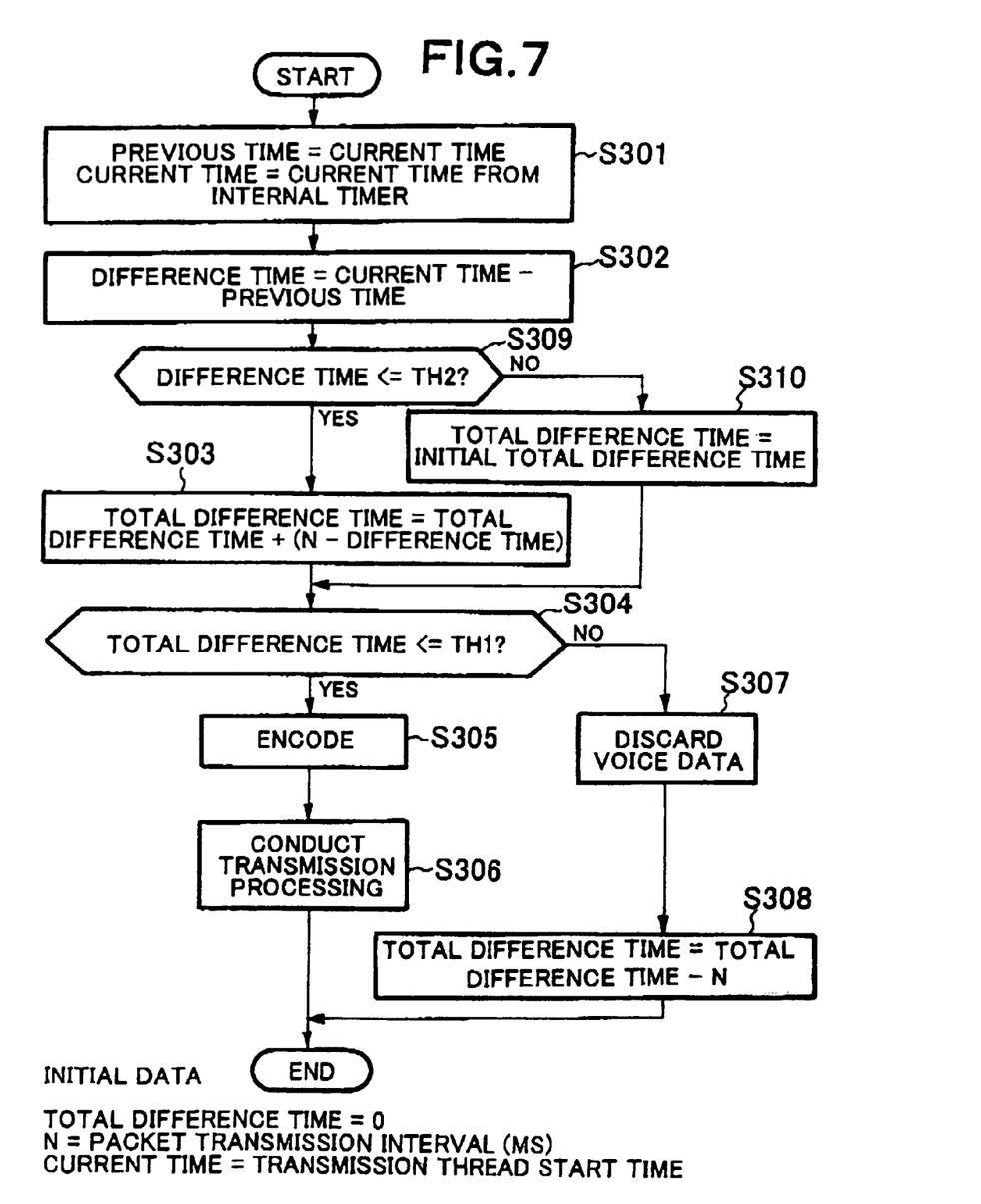
FIG. 7 is a flow chart showing operation of the flow control unit according to the second embodiment of the present invention.

FIG. 7 is a flow chart showing operation of the flow control unit 163 according to the second embodiment.

As evident from comparison of FIG. 7 with FIG. 4, the operation of the flow control unit 163 according to the second embodiment differs from the operation of the flow control unit 163 according to the first embodiment in that steps S309 and S310 are added.

At the step S309, the comparator 163-16 makes a decision as to whether the output value of the difference time register 163-6 is less than the output value of the TH2 register (step S309).

If a result of the decision at the step S309 is true, the processing proceeds to the step S303 in the same way as the first embodiment.

If the result of the decision at the step S309 is false, the total difference time is initialized to the initial total difference time in the initial total difference time register 163-17 (step S310) and the processing proceeds to the step S304. The initial total difference time is set equal to some value in a range from N to 0.

According to the second embodiment, it is possible to certainly transmit voice data immediately after resuming the talking state after an interruption such as muting takes place. Furthermore, it is possible to prevent the total difference time from becoming a minus value having a great absolute value. Therefore, it is possible to prevent a case where data discarding is not conducted even when the input data is excessive in a certain period after resuming the talking state after an interruption such as muting takes place.

The present invention can be utilized to packetize data and transmit it at regular intervals even if the data becomes excessive.

What is claimed is:

1. A packet transmission control method comprising the steps of:

subtracting previous data group input time from current data group input time in order to obtain a difference time each time a data group is input;

subtracting said difference time from a packet transmission interval in order to obtain an interval difference;

adding said interval difference to a total difference time;

determining whether or not said total difference time is greater than a first predetermined value;

transmitting the input data group as a packet, if said total difference time is not greater than said first predetermined value; and discarding the input data group and initializing said total difference time to a non-zero value obtained by subtracting said packet transmission interval from said total difference time, if said total difference time is greater than said first predetermined value.

2. The packet transmission control method according to claim 1, wherein if said difference time is greater than a second predetermined value, the step of adding said interval difference to said total difference time is substituted by a step of initializing said total difference time to a third predetermined value.

3. The packet transmission control method according to claim 2, wherein said third predetermined value is in a range between a value obtained by subtracting said packet transmission interval from said first predetermined value and said total difference time.

4. A packet transmission control apparatus comprising:

means for subtracting previous data group input time from current data group input time in order to obtain a difference time each time a data group is input;

means for subtracting said difference time from a packet transmission interval in order to obtain an interval difference;

means for adding said interval difference to a total difference time;

means for determining whether or not said total difference time is greater than a first predetermined value;

means for transmitting the input data group as a packet, if said total difference time is not greater than said first predetermined value; and means for discarding the input data group and initializing said total difference time to a non-zero value obtained by subtracting said packet transmission interval from said total difference time, if said total difference time is greater than said first predetermined value.

5. The packet transmission control apparatus according to claim 4, wherein if said difference time is greater than a second predetermined value, the means for adding said interval difference to said total difference time is substituted by means for initializing said total difference time to a third predetermined value.

6. The packet transmission means method according to claim 5, wherein said third predetermined value is in a range between a value obtained by subtracting said packet transmission interval from said first predetermined value and said total difference time.

7. A packet transmission computer readable medium storing a control program product embodied on a computer-readable medium and comprising codes that, when executed, cause a computer to perform a packet transmission control method, the packet transmission control method comprising the steps of:

subtracting previous data group input time from current data group input time in order to obtain a difference time each time a data group is input;

subtracting said difference time from a packet transmission interval in order to obtain an interval difference;

adding said interval difference to a total difference time;

determining whether or not said total difference time is greater than a first predetermined value;

transmitting the input data group as a packet, if said total difference time is not greater than said first predetermined value; and discarding the input data group and initializing said total difference time to a non-zero value obtained by subtracting said packet transmission interval from said total difference time, if said total difference time is greater than said first predetermined value.

8. The packet transmission computer readable medium according to claim 7, wherein if said difference time is greater than a second predetermined value, the step of adding said interval difference to said total difference time is substituted by a step of initializing said total difference time to a third predetermined value.

9. The packet transmission computer readable medium according to claim 8, wherein said third predetermined value is in a range between a value obtained by subtracting said packet transmission interval from said first predetermined value and said total difference time.

10. The packet transmission control method according to claim 2, wherein if said difference time is greater than the second predetermined value, muting of voice data is determined to have taken place, and wherein the second predetermined value is set to a value about 10 times greater than the packet transmission interval.

11. The packet transmission control apparatus according to claim 5, wherein if said difference time is greater than the second predetermined value, muting of voice data is determined to have taken place, and wherein the second predetermined value is set to a value about 10 times greater than the packet transmission interval.

12. The packet transmission computer readable medium according to claim 8, wherein if said difference time is greater than the second predetermined value, muting of voice data is determined to have taken place, and wherein the second predetermined value is set to a value about 10 times greater than the packet transmission interval.

* * * * *